United States Patent
Choi (10) Patent No.: US 11,633,923 B2
(45) Date of Patent: Apr. 25, 2023

(54) APPARATUS AND METHOD FOR APPLYING ADHESIVE

(71) Applicant: LG Chem, Ltd., Seoul (KR)

(72) Inventor: Sung Ho Choi, Daejeon (KR)

(73) Assignee: LG Energy Solution, Ltd.

( * ) Notice: Subject to any disclaimer, the term of this patent is extended or adjusted under 35 U.S.C. 154(b) by 270 days.

(21) Appl. No.: 16/982,243

(22) PCT Filed: Aug. 27, 2019

(86) PCT No.: PCT/KR2019/010932
§ 371 (c)(1),
(2) Date: Sep. 18, 2020

(87) PCT Pub. No.: WO2020/105848
PCT Pub. Date: May 28, 2020

(65) Prior Publication Data
US 2021/0031462 A1 Feb. 4, 2021

(30) Foreign Application Priority Data
Nov. 20, 2018 (KR) .......................... 10-2018-0143264

(51) Int. Cl.
*B29C 65/52* (2006.01)
*B05C 3/09* (2006.01)
(Continued)

(52) U.S. Cl.
CPC ................ *B29C 65/52* (2013.01); *B05C 3/09* (2013.01); *B05C 11/10* (2013.01); *B05C 13/02* (2013.01);
(Continued)

(58) Field of Classification Search
CPC ......... B29C 65/52; B29C 35/08; B29C 65/48; B29C 65/4845; B29C 2035/0827;
(Continued)

(56) References Cited

U.S. PATENT DOCUMENTS 4,976,998 A 12/1990 Morimitu et al.
5,489,409 A 2/1996 Koganezawa et al.
(Continued)

FOREIGN PATENT DOCUMENTS

CN 102019251 A 4/2011
CN 201862534 U * 6/2011
(Continued)

OTHER PUBLICATIONS

Search Report from Chinese Office Action for Application No. 201911135245.4 dated Nov. 25, 2020; 3 pages.
(Continued)

*Primary Examiner* — Laura Edwards
(74) *Attorney, Agent, or Firm* — Lerner David LLP (57) ABSTRACT

An apparatus for applying a liquid adhesive according to an embodiment of the present invention includes: a side part including a support surface configured to support one surface of an upright secondary battery; and a lower part including an adhesion space configured to accommodate the liquid adhesive therein and configured to accommodate insertion of a sealing part disposed at the one surface of the upright secondary battery, the lower part having a passage extending from an outer periphery of the lower part to the adhesion space, the passage configured to permit the liquid adhesive to flow from the outer periphery to the adhesion space, wherein the lower part is disposed below the side part.

13 Claims, 10 Drawing Sheets (51) Int. Cl.
*B05C 11/10* (2006.01)
*B05C 13/02* (2006.01)
*B05D 1/18* (2006.01)
*C09J 175/14* (2006.01)
*H01M 10/04* (2006.01)
*B29C 35/08* (2006.01)
*B29C 65/48* (2006.01)
*B32B 37/00* (2006.01)
*H01M 50/105* (2021.01)
*B32B 37/12* (2006.01)

(52) U.S. Cl.
CPC ............... *B05D 1/18* (2013.01); *B29C 35/08* (2013.01); *B29C 65/48* (2013.01); *B29C 65/4845* (2013.01); *B32B 37/0046* (2013.01); *C09J 175/14* (2013.01); *H01M 10/04* (2013.01); *H01M 10/0404* (2013.01); *B32B 2037/1253* (2013.01); *H01M 50/105* (2021.01)

(58) Field of Classification Search
CPC ........... B05C 3/09; B05C 11/10; B05C 13/02; B05D 1/18; C09J 175/14; H01M 10/04; H01M 50/10; H01M 50/105; H01M 10/0404; B32B 37/0046; B32B 2037/1253; Y02E 60/10; Y02P 70/50
USPC ............................................... 156/578, 275.5
See application file for complete search history.

(56) References Cited

U.S. PATENT DOCUMENTS 6,165,547 A * 12/2000 Leedom ................ G02B 1/105
427/430.1
2001/0012588 A1 * 8/2001 Kaido ..................... H01M 4/04
118/58
2004/0241541 A1 12/2004 Watanabe et al.
2007/0264570 A1 * 11/2007 Oh ......................... H01M 4/621
429/217
2012/0024225 A1 2/2012 Wang
2017/0297269 A1 10/2017 Zhang et al.
2018/0047950 A1 2/2018 Lim et al.

FOREIGN PATENT DOCUMENTS

| | | |
|---|---|---|
| CN | 102336302 A | 2/2012 |
| CN | 103567109 A | 2/2014 |
| CN | 204018121 U | 12/2014 |
| CN | 105826612 A | 8/2016 |
| CN | 205797689 U | 12/2016 |
| CN | 206009108 U | 3/2017 |
| CN | 206104251 U | 4/2017 |
| JP | H07068620 A * | 3/1995 |
| JP | H11068136 A | 3/1999 |
| JP | 2010192748 A | 9/2010 |
| JP | 4931948 B2 | 5/2012 |
| JP | 2013157191 A | 8/2013 |
| JP | 2014117634 A | 6/2014 |
| JP | 5766132 B2 | 8/2015 |
| JP | 2016207494 A | 12/2016 |
| KR | 20040038620 A | 5/2004 |
| KR | 20160058674 A | 5/2016 |
| KR | 101852250 B1 | 4/2018 |
| KR | 20180083123 A | 7/2018 |

OTHER PUBLICATIONS

International Search Report for Application No. PCT/KR2019/010932 dated Dec. 5, 2019, 2 pages.

* cited by examiner

APPARATUS AND METHOD FOR APPLYING ADHESIVE

CROSS-REFERENCE TO RELATED APPLICATION

The present application is a national phase entry under 35 U.S.C. § 371 of International Application No. PCT/KR2019/010932, filed on Aug. 27, 2019, published in Korean, which claims priority from Korean Patent Application No. 10-2018-0143264, filed on Nov. 20, 2018, the disclosures of which are hereby incorporated by reference in their entireties.

TECHNICAL FIELD

The present invention relates to an apparatus and method for applying an adhesive, and more particularly, to an apparatus and method for applying an adhesive, which are capable of preventing non-coating of a liquid adhesive and improving productivity of a secondary battery.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In general, in order to manufacture the lithium secondary battery, first, electrode active material slurry is applied to a positive electrode collector and a negative electrode collector to manufacture a positive electrode and a negative electrode. Then, the electrodes are stacked on both sides of a separator form an electrode assembly. Also, the electrode assembly is accommodated in a battery case, an electrolyte is injected, and then, sealing is performed.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material having a variable shape.

When a sealing part is left as it is after the pouch type battery case is sealed, a metal of a pouch film is exposed to the outside through a cross-section of the sealing part. Thus, the metal may be corroded or come into contact with an electrode of the secondary battery to cause short circuit. As a result, it is necessary not to expose the cross-section of the sealing part.

According to the related art, a double side folding method in which the sealing part is folded twice is performed, or a method in which an insulation tape is attached to the sealing part has been performed. However, this method has a disadvantage in that manufacturing yield is deteriorated, and a time taken to optimize the equipment is long. In order to solve this problem, recently, a method for applying a liquid adhesive to a sealing part to cure the liquid adhesive has been developed. However, a portion of a nozzle that applies the liquid adhesive may be blocked to cause a problem that the liquid adhesive is not applied to the sealing parts of some secondary batteries.

DISCLOSURE OF THE INVENTION

Technical Problem

An object to be solved by the present invention is to provide an apparatus and method for applying an adhesive, which are capable of preventing non-coating of a liquid adhesive and improving productivity of a secondary battery.

The objects of the present invention are not limited to the aforementioned object, but other objects not described herein will be clearly understood by those skilled in the art from descriptions below.

Technical Solution

An apparatus for applying an adhesive according to an embodiment of the present invention for solving the above object includes: a side part including a support surface configured to support one surface of an erected secondary battery; and a lower part including an adhesion space which accommodates the liquid adhesive and in which a sealing part disposed at the one surface of the erected secondary battery is inserted and a passage connected to the adhesion space so that the liquid adhesive flows to the adhesion space, wherein the lower part is disposed below the side part. In one example, the lower part may have a base, an upper contact surface extending away from a bottom end of the support surface, and an adhesion space that is a recess defined in the lower part, the adhesion space located above the base and extending below the upper contact surface. The lower part may have a passage extending from an inlet at an outer periphery of the lower part to an outlet exposed to the adhesion space. The outlet of the passage may be disposed within the adhesion space between the base of the lower part and the upper contact surface of the lower part.

Also, the adhesion space may be recessed downward from a top surface of the lower part.

Also, the adhesion space may have a width that is gradually narrowed downward.

Also, in the adhesion space, an inner wall facing the support surface may include an upper inner wall of which an edge is chamfered or filleted and a lower inner wall that is parallel to the support surface.

Also, the apparatus may further include a dispenser configured to inject the liquid adhesive into the passage.

Also, the apparatus may further include an adhesive tank that stores the liquid adhesive to supply the liquid adhesive to the dispenser.

Also, the passage may be provided in plurality.

Also, the side part may further include an inclined surface having a specific inclination toward the inside of the side part from a lower end of the support surface.

A method for applying an adhesive according to an embodiment of the present invention for solving the above object includes: a step of accommodating the liquid adhesive in an adhesion space of an apparatus for applying the adhesive through a passage; a step of erecting the secondary battery to insert a sealing part disposed at one side of the secondary battery into the adhesion space; a step of withdrawing the secondary battery; and a step of irradiating ultraviolet rays to the sealing part coated with the liquid adhesive. In one example, the method may include flowing the liquid adhesive through a passage extending from an inlet at an outer periphery of the apparatus to an outlet exposed to the adhesion space. The apparatus may have a side part having a support surface, and a lower part having a base, an upper contact surface extending away from a bottom end of the support surface, and an adhesion space that is a recess defined in the lower part, the adhesion space located above the base and extending below the upper contact surface, the outlet of the passage being disposed within the adhesion space between the base of the lower part and the upper contact surface of the lower part. The method may also include positioning the secondary battery upright and inserting a sealing part disposed at one side of the secondary battery in a downward direction into the adhesion space; and withdrawing the secondary battery in an upward direction from the adhesion space.

Also, in the step of injecting the liquid adhesive, the liquid adhesive may be injected into the passage by using a dispenser.

Also, the dispenser may receive the liquid adhesive from an adhesive tank storing the liquid adhesive to inject the liquid adhesive into the passage.

Also, in the step of injecting the sealing part, the secondary battery may have one surface supported by a support surface of the apparatus for applying the adhesive, and the sealing part disposed at the one side of the secondary battery may be inserted into the adhesion space.

Also, the liquid adhesive may be a urethane acrylate-based adhesive.

Particularities of other embodiments are included in the detailed description and drawings.

Advantageous Effects

The embodiments of the present invention may have at least the following effects.

Since a nozzle is not used, the non-coating of the liquid adhesive due to the blocking of the nozzle may be prevented.

Also, since it is unnecessary to set the line, along which the nozzle moves to apply the liquid adhesive, and the coating time, the manufacturing yield may be improved, and also, the productivity of the secondary battery may be improved.

The effects of the prevent invention are not limited by the aforementioned description, and thus, more varied effects are involved in this specification.

MODE FOR CARRYING OUT THE INVENTION

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

Figure 1:
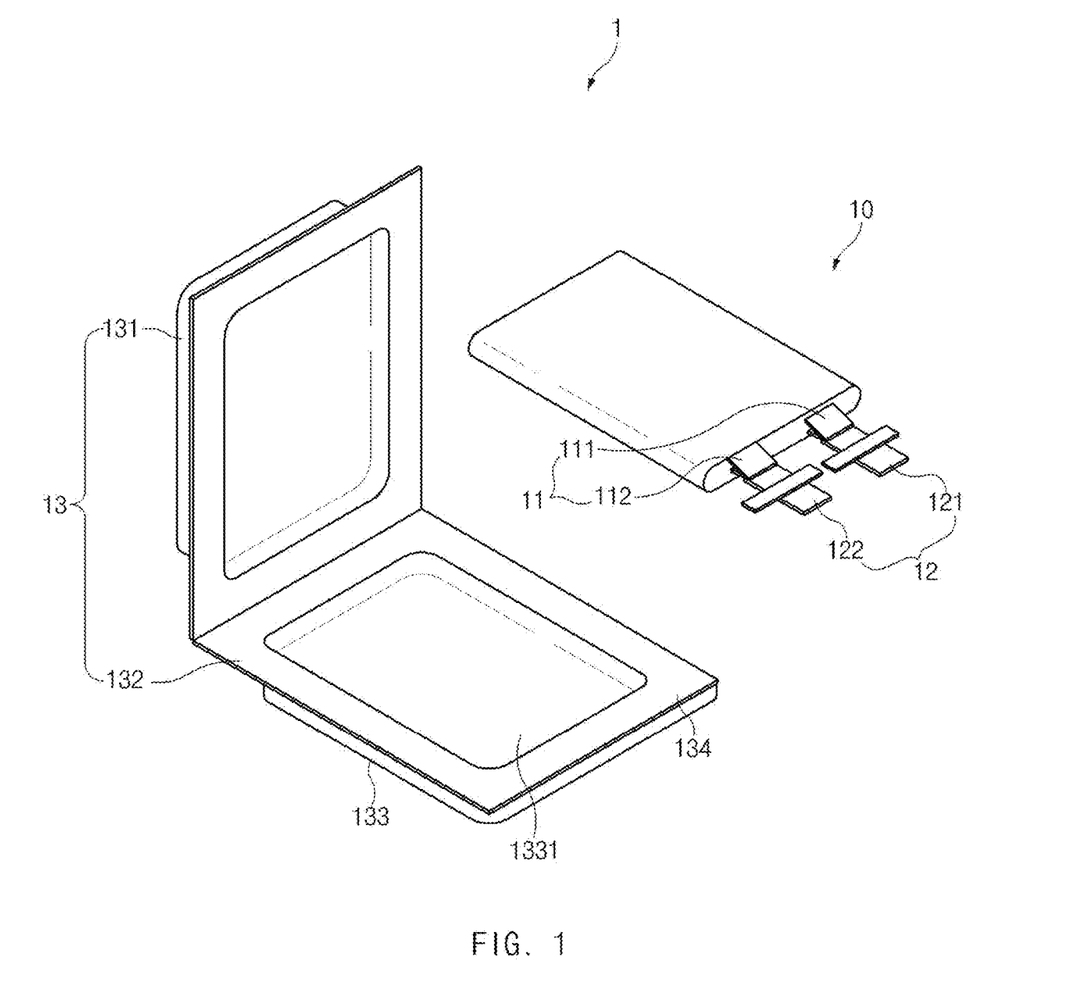
FIG. 1 is an assembled view of a pouch type secondary battery according to an embodiment of the present invention.
Figure 2:
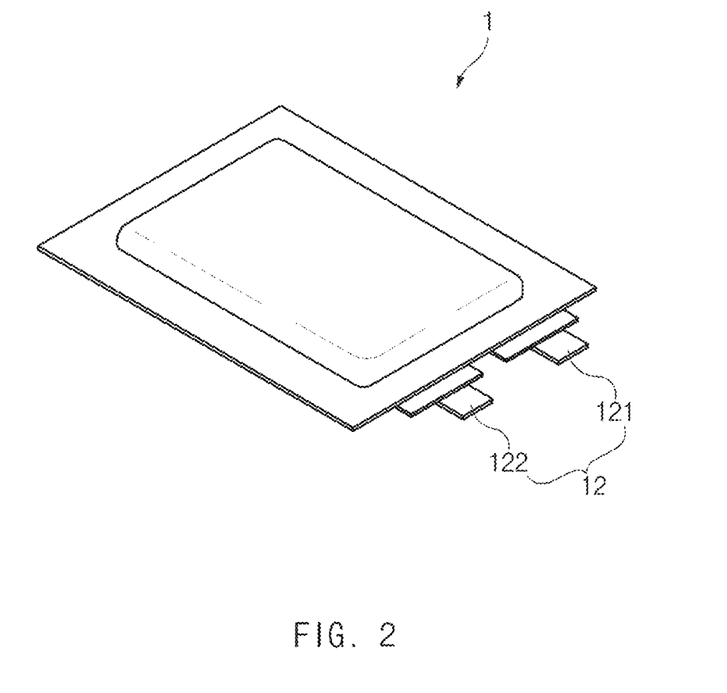
FIG. 2 is a perspective view of the pouch type secondary battery according to an embodiment of the present invention.

FIG. 1 is an assembled view of a pouch type secondary battery according to an embodiment of the present invention, and FIG. 2 is a perspective view of the pouch type secondary battery according to an embodiment of the present invention.

In a process of manufacturing a pouch type secondary battery 1 according to an embodiment of the present invention, first, slurry in which an electrode active material, a binder, and a plasticizer are mixed with each other is applied to a positive electrode collector and a negative electrode collector to manufacture a positive electrode and a negative electrode. Thereafter, the negative electrode collector and the positive electrode plate are respectively laminated on both sides of a separator to form an electrode assembly 10 having a predetermined shape, and then, the electrode assembly 10 is inserted into a battery case 13, an electrolyte is injected, and sealing is performed.

As illustrated in FIG. 1, the electrode assembly 10 includes an electrode tab 11. The electrode tab 11 is connected to each of a positive electrode and a negative electrode of the electrode assembly 10 to protrude to the outside of the electrode assembly 10, thereby providing a path, through which electrons are moved, between the inside and outside of the electrode assembly 10. A collector of the electrode assembly 10 is constituted by a portion coated with an electrode active material and a distal end, on which the electrode active material is not applied, i.e., a non-coating portion. Also, the electrode tab 11 may be formed by cutting the non-coating portion or by connecting a separate conductive member to the non-coating portion through ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 through spot welding. Also, a portion of the electrode lead 12 is surrounded by an insulation part. The insulation part may be disposed to be limited within a sealing part 134, at which an upper pouch 131 and a lower pouch 132 of the battery case 13 are thermally fused, so that the electrode lead 12 is bonded to the battery case 13. Also, electricity generated from the electrode assembly 10 may be prevented from flowing to the battery case 13 through the electrode lead 12, and the sealing of the battery case 13 may be maintained. Thus, the insulation part may be made of a nonconductor having non-conductivity, which is not electrically conductive. In general, although an insulation tape which is easily attached to the electrode lead 12 and has a relatively thin thickness is mainly used as the insulation part, the present invention is not limited thereto. For example, various members may be used as the insulation part as long as the members are capable of insulating the electrode lead 12.

The electrode lead 12 may extend in the same direction or extend in directions different from each other according to the formation positions of the positive electrode tab 111 and the negative electrode tab 112. The positive electrode lead 121 and the negative electrode lead 122 may be made of materials different from each other. That is, the positive electrode lead 121 may be made of the same material as the positive electrode plate, i.e., an aluminum (Al) material, and the negative electrode lead 122 may be made of the same material as the negative electrode plate, i.e., a copper (Cu) material or a copper material coated with nickel (Ni). Also, a portion of the electrode lead 12, which protrudes to the outside of the battery case 13, may be provided as a terminal part and electrically connected to an external terminal.

In the pouch type secondary battery 1 according to an embodiment of the present invention, the battery case 13 may be a pouch made of a flexible material. Hereinafter, the case in which the battery case 13 is the pouch will be described. The battery case 13 accommodates the electrode assembly 10 so that a portion of the electrode lead 12, i.e., the terminal part is exposed and then is sealed. As illustrated in FIG. 1, the battery case 13 includes the upper pouch 131 and the lower pouch 132. An accommodation space 1331 in which the electrode assembly 10 is accommodated may be provided in the lower pouch 132, and upper pouch 131 may cover an upper side of the accommodation space 1331 so that the electrode assembly 10 is not separated to the outside of the battery case 13. Here, as illustrated in FIG. 1, the accommodation space 1331 may also be provided in the upper pouch 131 to accommodate the electrode assembly 10 through an upper side of the upper pouch 131. As illustrated in FIG. 1, one side of the upper pouch 131 and one side of the lower pouch 132 may be connected to each other. However, the present invention is not limited thereto. For example, the upper pouch 131 and the lower pouch may be separately manufactured to be separated from each other.

When the electrode lead 12 is connected to the electrode tab 11 of the electrode assembly 10, and the insulation part is provided on a portion of the electrode lead 12, the electrode assembly 10 may be accommodated in the accommodation space 1331 provided in the lower pouch 132, and the upper pouch 131 may cover the upper side of the accommodation space 1331. Also, when the electrolyte is injected, and the sealing part 134 provided on the edge of each of the upper pouch 131 and the lower pouch 132 is sealed, the secondary battery 1 is manufactured as illustrated in FIG. 2.

Figure 3:
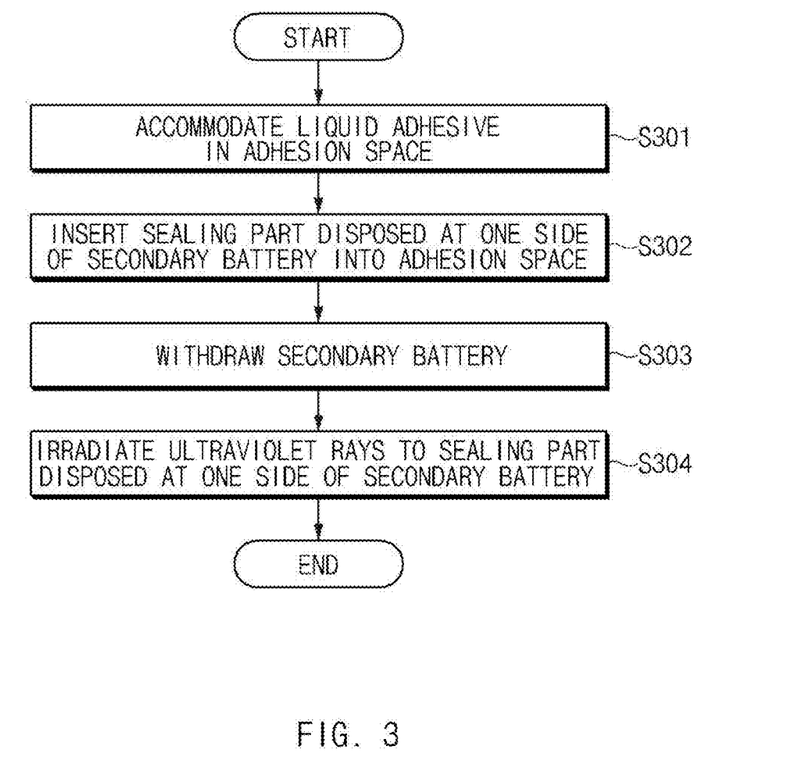
FIG. 3 is a flowchart illustrating a method for applying an adhesive according to an embodiment of the present invention.

FIG. 3 is a flowchart illustrating a method for applying an adhesive according to an embodiment of the present invention.

In a method for applying an adhesive according to the present invention, since a nozzle is not used, non-coating of a liquid adhesive 3 due to blocking of the nozzle may be prevented. Also, since it is unnecessary to set a line, along which the nozzle moves to apply the liquid adhesive 3, and a coating time, manufacturing yield may be improved, and also, productivity of a secondary battery 1 may be improved.

For this, the method for applying the adhesive according to an embodiment of the present invention includes: a step of accommodating the liquid adhesive 3 in an adhesion space 221 of an apparatus 2 for applying an adhesive through a passage 222; a step of standing up the secondary battery 1 to insert a sealing part 134 disposed at one side of the secondary battery 1 into the adhesion space 221; a step of withdrawing the secondary battery 1; and a step of irradiating ultraviolet rays to the sealing part 134 coated with the liquid adhesive 3.

Hereinafter, each of the steps illustrated in the flowchart of FIG. 3 will be described with reference to FIGS. 4 to 8.

Figure 4:
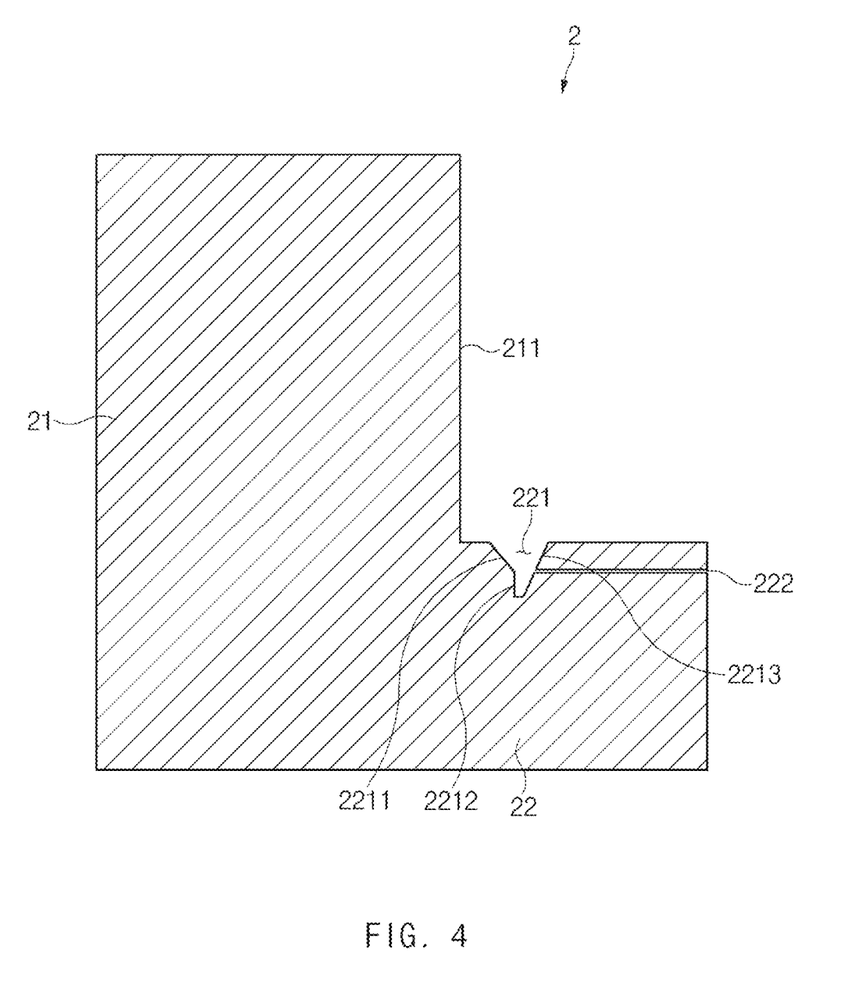
FIG. 4 is a schematic side view of an apparatus for applying an adhesive according to an embodiment of the present invention.

FIG. 4 is a schematic side view of the apparatus 2 for applying the adhesive according to an embodiment of the present invention.

As illustrated in FIG. 4, the apparatus 2 for applying the adhesive according to the present invention includes: a side part 21 including a support surface 211 supporting one surface of the upright secondary battery 1; and a lower part 22 including an adhesion space 221 which accommodates the liquid adhesive 3 and in which the sealing part 134 disposed at the one side of the upright secondary battery 1 is inserted and a passage 222 connected to the adhesion space 221 so that the liquid adhesive 3 flows to the adhesion space 221, wherein the lower part 22 is disposed below the side part 21.

The side part 21 of the apparatus 2 for applying the adhesive includes the support surface 211. The support surface 211 supports one surface of the secondary battery 1 when the secondary battery 1 is positioned upright to be inserted into the adhesion space 221. For this purpose, the support surface 211 may be flat. It is preferable that the support surface 211 is parallel to the one surface of the upright secondary battery 1. Thus, the one surface of the secondary battery 1 may be stably supported.

The lower part 22 of the apparatus 2 for applying the adhesive 3 is disposed below the side part 21 and includes the adhesion space 221 and the passage 222. The side part 21 and the lower part 22 of the apparatus 2 for applying the adhesive 3 may be manufactured separately and then assembled, but the present invention is not limited thereto. For example, the side part 21 and the lower part 22 may be manufactured integrally, i.e., in various manners without being limited thereto.

The adhesion space 221 accommodates the liquid adhesive 3 (see FIG. 5), and the sealing part 134 disposed at the one side of the secondary battery 1 is inserted into the adhesion space 22. For this, as illustrated in FIG. 4, the adhesion space 221 may be recessed downward from a top surface of the lower part 22 of the apparatus 2 for applying the adhesive. When the secondary battery 1 is positioned upright, the one surface of the secondary battery 1, which is supported by the support surface 211, may face a left or right side, and the sealing part 134 of the secondary battery may face a lower side. Thus, since the adhesion space 221 is formed in the lower part 22 disposed below the side part 21, the sealing part 134 may be smoothly inserted into the adhesion space 221 while the secondary battery 1 is supported by the support surface 211.

The adhesion space 221 accommodates the liquid adhesive 3. Thus, when the sealing part 134 of the secondary battery 1 is inserted into the adhesion space 221, the sealing part 134 of the secondary battery 1 is immersed in the liquid adhesive 3. Also, when the secondary battery 1 is withdrawn again, the liquid adhesive 3 is applied to a portion of the sealing part 134 immersed in the liquid adhesive 3. Thus, the more the adhesion space 221 increases in depth, the more an amount of liquid adhesive 3 to be accommodated may increase. As a result, an area of the sealing part 134 to be coated with the liquid adhesive 3 may be widened. Also, as the more the adhesion space 221 decreases in depth, the more an amount of liquid adhesive 3 to be accommodated may decrease. As a result, the area of the sealing part 134 to be coated with the liquid adhesive 3 may be narrowed.

The liquid adhesive 3 may be a urethane acrylate (UA)-based adhesive that is cured when ultraviolet (UV) rays are irradiated. The urethane acrylate is a compound produced by a UV-curable urethane resin and is a general name of a compound having a urethane bond and an acrylate group together. The urethane acrylate is excellent in insulation, flexibility, and abrasion resistance. Thus, when the UV rays 41 (see FIG. 8) is irradiated to the liquid adhesive 3 applied to the sealing part 134, the liquid adhesive 3 may be cured to insulate a metal exposed to a cross-section of the sealing part 134.

The adhesion space 221 is narrower downward. That is, an upper width of the adhesion space 221 may be relatively wider than a lower width. On the other hand, the lower width of the adhesion space 221 may be relatively narrower than the upper width. Particularly, as illustrated in FIG. 4, an inner wall (referred to a left inner wall in FIG. 4) which faces the support surface 211 in the adhesion space 221 may include an upper inner wall 2211 and a lower inner wall 2212. Also, the upper inner wall 2211 may have an edge that is chamfered or filleted so that the width of the adhesion space 221 is continuously narrowed downward. Thus, the sealing part 134 of the secondary battery 1 may be easily inserted. Also, the lower inner wall 2212 may be parallel to the support surface 211. Thus, when the sealing part 134 of the secondary battery 1 is fully inserted into the adhesion space 221, the sealing part 134 of the secondary battery 1 may be stably supported by the lower inner wall 2212. A stepped portion may not be formed on the inner wall 2213 (referred to a right inner wall in FIG. 4) which faces a side opposite to the support surface 211 in the adhesion space 221. Thus, there may be no obstacle that prevents the insertion of the sealing unit 134 of the secondary battery 1.

The passage 222 is connected to the adhesion space 221 to provide a flow path through which the liquid adhesive 3 flows into the adhesion space 221. Although only one passage 222 is formed, the present invention is not limited thereto. It is preferable that a plurality of passages 222, 222a are formed (FIG. 4a) so that the liquid adhesive 3 is quickly accommodated in the adhesion space 221.

Figure 4A:
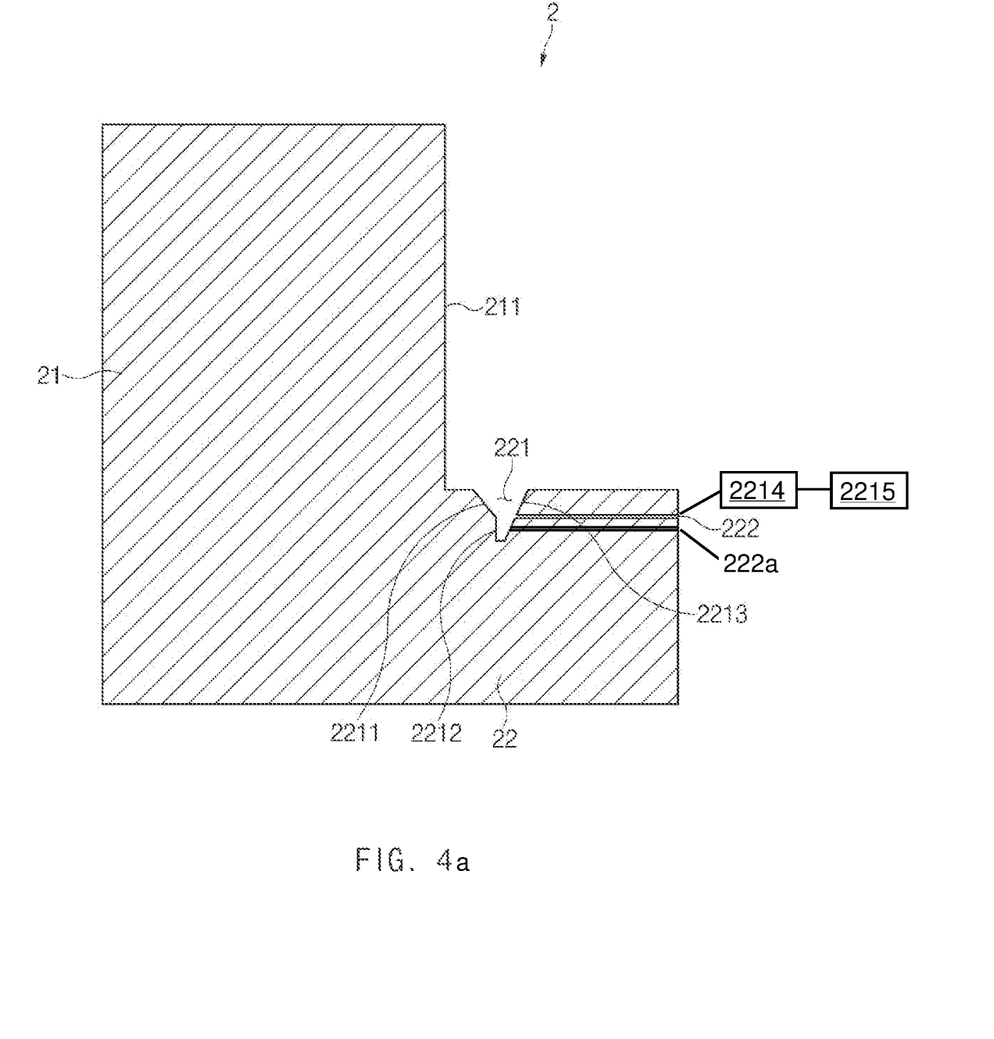
FIG. 4A is a schematic side view of an apparatus for applying an adhesive according to an embodiment of the present invention.

As shown in FIG. 4a, the liquid adhesive 3 may be separately provided to be stored in an adhesive tank 2215. Also, the adhesive tank 2215 supplies the liquid adhesive 3 stored therein to a dispenser 2214, and the dispenser injects the supplied liquid adhesive 3 to the passage 222. Thus, the liquid adhesive 3 injected into the passage 222 may flow through the passage 222 so as to be accommodated in the adhesion space 221. When the passage 222 is provided in plurality, only one dispenser may be formed to inject the liquid adhesive 3 into each passage 222 while moving. However, the present invention is not limited thereto. For example, the dispenser may be provided in plurality so that the dispenser corresponding to each of the passages 222 injects the liquid adhesive 3 into the corresponding passage 222.

In order to insert the sealing part 134 of the secondary battery 1 into the adhesion space 221, a user has to directly grip an upper portion of the secondary battery 1 or grip the upper portion of the secondary battery 1 by using a separate gripper. However, if a height of the apparatus 2 for applying the adhesive is greater than that of the secondary battery 1, the support surface 211 and the user's hand or the gripper may collide with each other. Thus, it is preferable that the apparatus 2 for applying the adhesive has a height less than that of the secondary battery 1 when the sealing part 134 of the secondary battery 1 is inserted into the adhesion space 221.

Figure 5:
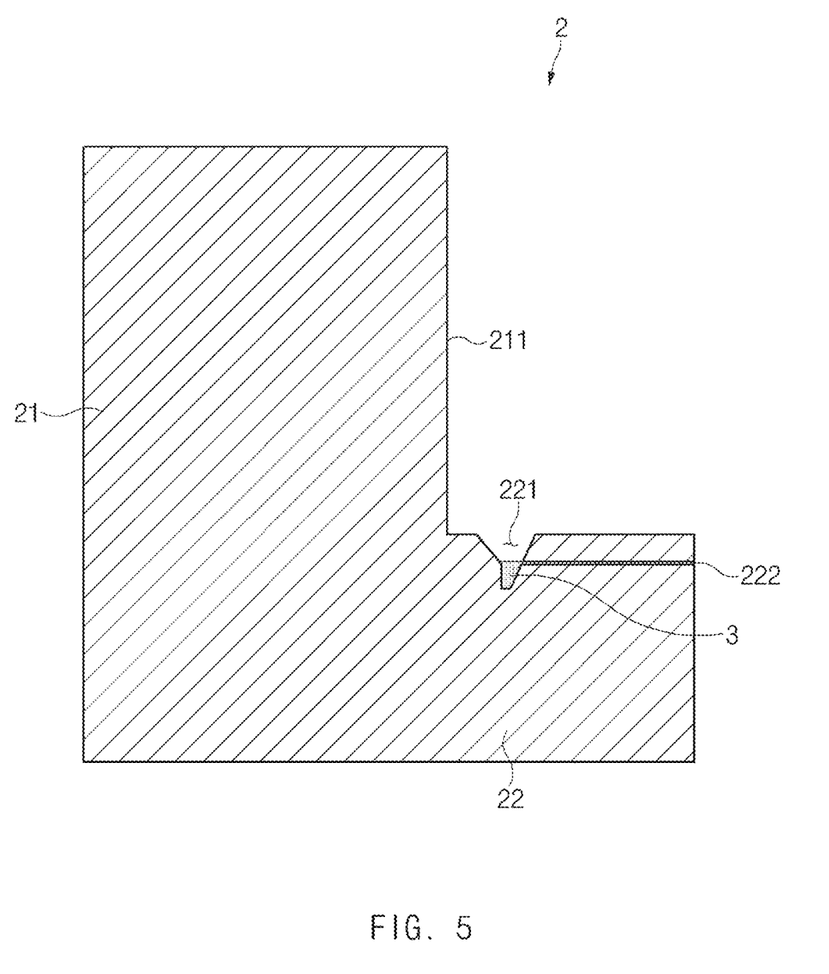
FIG. 5 is a schematic side view illustrating a state in which a liquid adhesive is accommodated in an adhesion space of the apparatus for applying the adhesive according to an embodiment of the present invention.

FIG. 5 is a schematic side view illustrating a state in which the liquid adhesive 3 is accommodated in the adhesion space 221 of the apparatus 2 for applying the adhesive according to an embodiment of the present invention.

In order to apply the adhesive to the sealing part 134 of the secondary battery 1, as illustrated in FIG. 5, first, the liquid adhesive 3 is accommodated in the adhesion space 221 of the apparatus 2 for applying the adhesive through the passage 222 (S301). Here, when the adhesive tank storing the liquid adhesive 3 supplies the liquid adhesive 3 to the dispenser, the liquid adhesive 3 may be injected into the passage 222 by using the dispenser. Thus, the liquid adhesive 3 may flow through the passage 222 so as to be accommodated in the adhesion space 221.

If an amount of liquid adhesive 3 is too small, the liquid adhesive 3 may not be sufficiently applied to the sealing part 134. If an amount of liquid adhesive 3 is too large, when the sealing part 134 is inserted into the adhesive space 221 and immersed in the liquid adhesive 3, the liquid adhesive 3 may leak to the outside of the adhesion space 221. Thus, an optimum amount of liquid adhesive 3, which is capable of being sufficiently applied to the sealing part 134 and does not leak to the outside of the adhesion space 221, may be experimentally derived.

Figure 6:
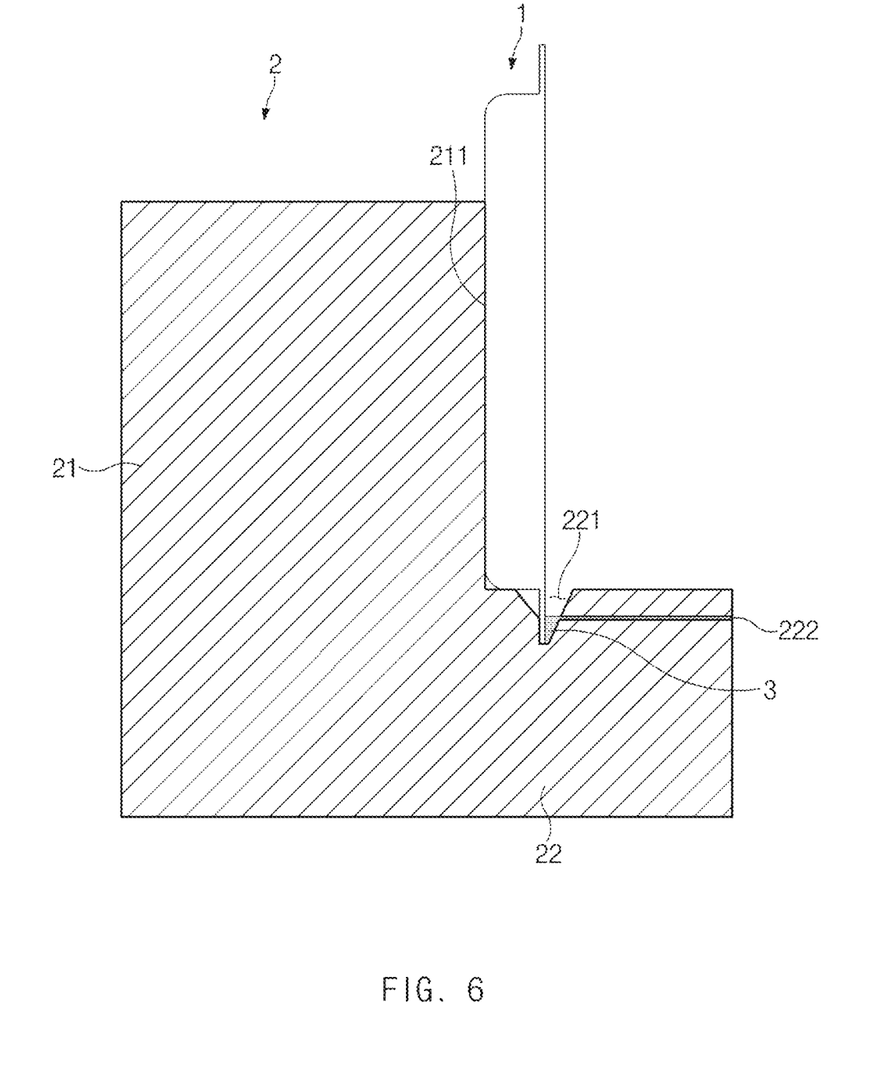
FIG. 6 is a schematic side view illustrating a state in which a sealing part of the secondary battery is inserted into the adhesion space of the apparatus for applying the adhesive according to an embodiment of the present invention.
Figure 7:
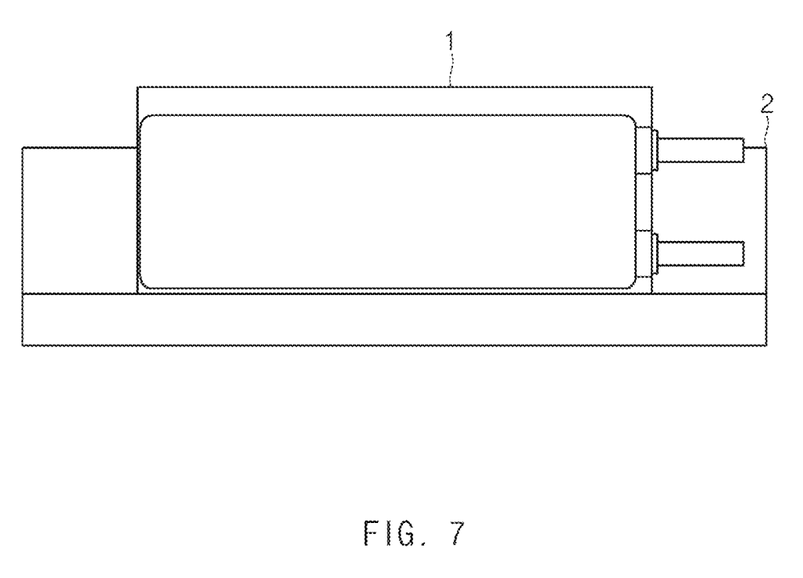
FIG. 7 is a schematic front view illustrating a state in which the sealing part of the secondary battery is inserted into the adhesion space of the apparatus for applying the adhesive according to an embodiment of the present invention.

FIG. 6 is a schematic side view illustrating a state in which the sealing part 134 of the secondary battery 1 is inserted into the adhesion space 221 of the apparatus 2 for applying the adhesive according to an embodiment of the present invention, and FIG. 7 is a schematic front view illustrating a state in which the sealing part 134 of the secondary battery 1 is inserted into the adhesion space 221 of the apparatus 2 for applying the adhesive according to an embodiment of the present invention.

When the liquid adhesive 3 is sufficiently accommodated in the adhesion space 221, as illustrated in FIGS. 6 and 7, the secondary battery 1 is positioned upright to insert the sealing part 134 disposed at the one side of the secondary battery 1 into the adhesion space 221 (S302). Here, when one surface of the secondary battery 1 is supported by the support surface 211 of the apparatus 2 for applying the adhesive, the secondary battery may be stably erected.

If the upper pouch 131 and the lower pouch 132 of the battery case 13 are manufactured by connecting one side of the upper pouch 131 to one side of the lower pouch 132, the connected portion is folded when the upper pouch 131 covers the accommodation space 1331. The folded portion does not need to be coated with the liquid adhesive 3 because the metal of the pouch film is not exposed to the outside. Since the metal of the pouch film is exposed to the outside, the sealing part 134, which is not the folded portion but thermally fused portion, has to be coated with the liquid adhesive 3. Thus, when the battery case 13 is positioned upright, the battery case 13 is positioned so that the sealing part 134 to which the liquid adhesive 3 is to be applied is disposed to face a lower side.

Although the secondary battery is positioned upright so that the secondary battery 1 has a full width in a vertical direction in FIGS. 6 and 7, the present invention is not limited thereto. For example, the secondary battery 1 may be positioned upright so that the secondary battery 1 has a full length in the vertical direction. If the secondary battery 1 is positioned so that the secondary battery 1 has the full width in the vertical direction, the sealing part 134 that is lengthily disposed in a longitudinal direction of the secondary battery 1 may be disposed to face the lower side. Also, the sealing part 134 formed lengthily in the longitudinal direction is inserted into the adhesion space 221 and immersed in the liquid adhesive 3. However, if the secondary battery 1 is positioned so that the secondary battery 1 has the full length in the vertical direction, the sealing part 134 formed lengthily in the width direction of the secondary battery 1 is disposed to face the lower side. Also, the sealing part 134 formed lengthily in the width direction is inserted into the adhesion space 221 and immersed in the liquid adhesive 3.

Figure 8:
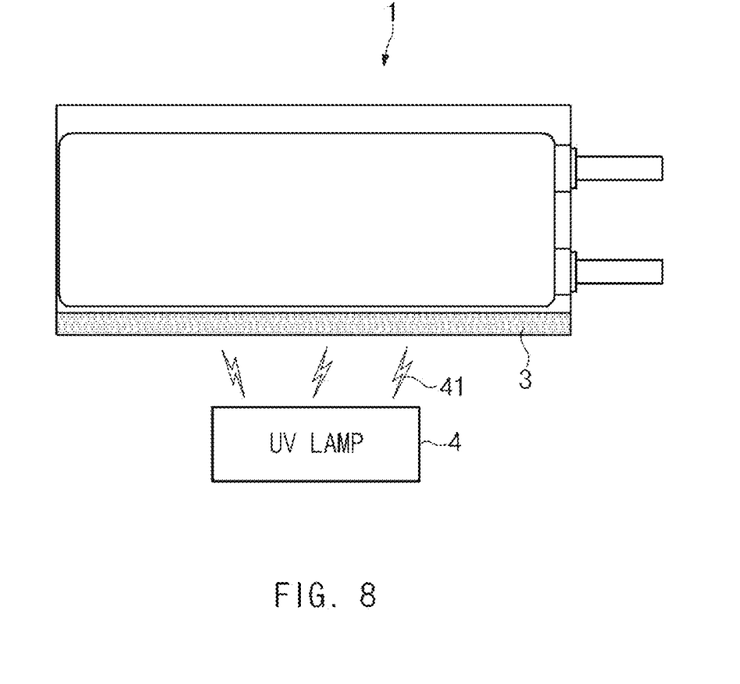
FIG. 8 is a schematic view illustrating a state in which ultraviolet rays are irradiated to the sealing part of the secondary battery according to an embodiment of the present invention.

FIG. 8 is a schematic view illustrating a state in which ultraviolet rays 41 are irradiated to the sealing part 134 of the secondary battery 1 according to an embodiment of the present invention.

After the sealing part 134 of the secondary battery 1 is fully immersed in the liquid adhesive 3, the secondary battery 1 is again withdrawn (S303). Thus, the liquid adhesive 3 is applied to a portion of the sealing portion 134 that is immersed in the liquid adhesive 3. Also, as illustrated in FIG. 8, the ultraviolet rays 41 are irradiated to the sealing part 134 to which the liquid adhesive 3 is applied by using an UV lamp 4 (S304).

The UV lamp 4 is a lamp which irradiates the ultraviolet rays 41 to the outside. Also, the ultraviolet rays 41 are an electromagnetic wave of which a wavelength is shorter than that of visible light and thus has a wavelength of approximately 10 nm to approximately 400 nm. The ultraviolet rays 41 have a very short wavelength and thus is invisible to the human eye and also have high energy. Thus, ultraviolet rays 41 may be easily used for sterilization and bleaching.

As described above, the liquid adhesive 3 may be a urethane acrylate (UA)-based adhesive that is cured when the ultraviolet rays 41 are irradiated. Thus, when the UV rays 41 is irradiated to the liquid adhesive 3 applied to the sealing part 134, the liquid adhesive 3 may be cured to insulate a metal exposed to a cross-section of the sealing part 134.

Figure 9:
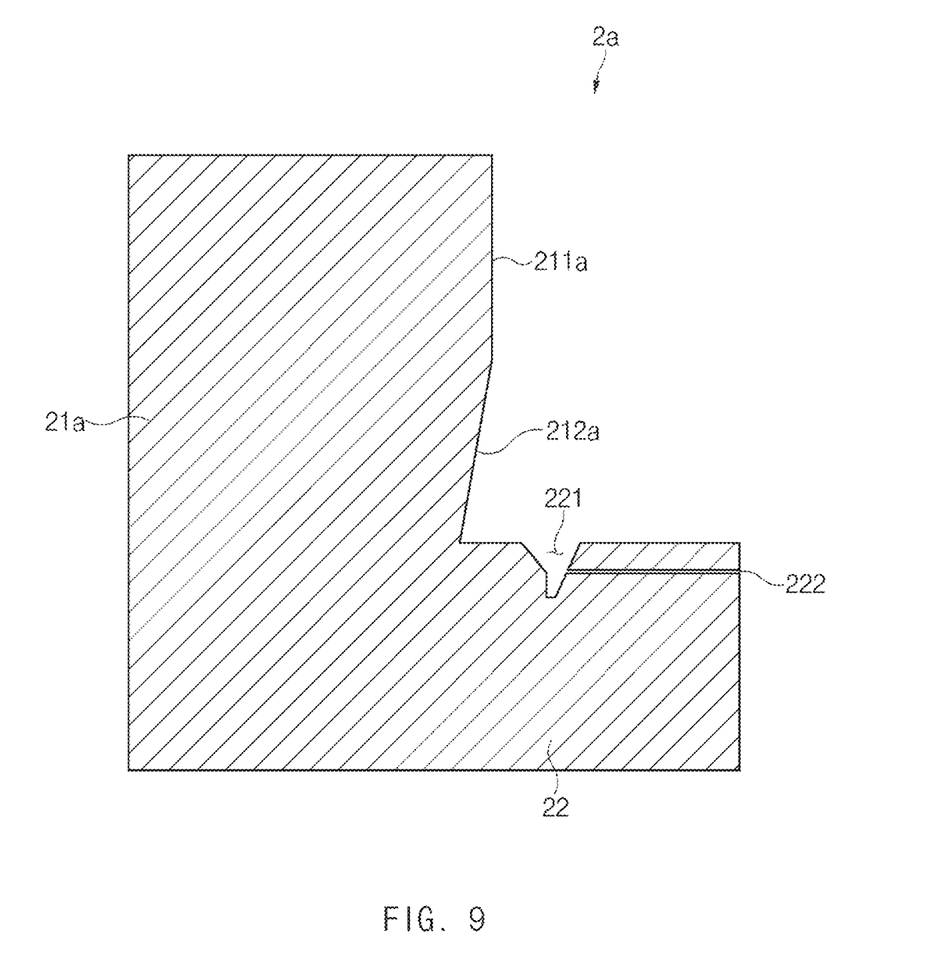
FIG. 9 is a schematic side view of an apparatus for applying an adhesive according to another embodiment of the present invention.

FIG. 9 is a schematic side view of an apparatus 2a for applying an adhesive according to another embodiment of the present invention.

In the apparatus 2 for applying an adhesive according to an embodiment of the present invention, the support surface 211 of the side part 21 is parallel to one surface of the secondary battery 1, and the support surface 211 extends up to the lower part 22 of the apparatus 2 for applying the adhesive. However, when the sealing portion 134 of the secondary battery 1 is withdrawn after being immersed in the liquid adhesive 3, a portion of the liquid adhesive 3 applied to the sealing part 134 of the secondary battery 1 may drop to contaminate a top surface of the lower part 22 of the apparatus 2 for applying the adhesive. However, even if the dropping liquid adhesive 3 is cleanly cleaned, the liquid adhesive 3 may remain on the connected edge between the side part 21 and the lower part 22 of the apparatus 2 for applying the adhesive. As a result, when the sealing part 134 of the secondary battery 1 is inserted into the adhesion space 221 later, an outer surface of the secondary battery 1 may be contaminated.

According to another embodiment of the present invention, as illustrated in FIG. 9, a side part 21a of an apparatus 2a for applying an adhesive has an inclined surface 212a having a specific inclination toward the inside of the side part 21a from a lower end of a support surface 221a. Thus, it is easy to visually determine whether the liquid adhesive 3 is contaminated on the top surface of the lower part 22, and the top surface of the contaminated lower part 22 may be easily cleaned. Also, the outer surface of the secondary battery 1 may be prevented from being contaminated.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus for applying a liquid adhesive, the apparatus comprising:
   a side part comprising a support surface configured to support one surface of an upright secondary battery; and
   a lower part comprising a base, an upper contact surface extending away from a bottom end of the support surface, and an adhesion space that is a recess defined in the lower part, the adhesion space located above the base and extending below the upper contact surface, the adhesion space configured to accommodate the liquid adhesive therein and configured to accommodate insertion of a sealing part disposed at the one surface of the upright secondary battery, the lower part having a passage extending from an inlet at an outer periphery of the lower part to an outlet exposed to the adhesion space, the passage configured to permit the liquid adhesive to flow from the outer periphery to the adhesion space,
   wherein the lower part is disposed below the side part, and
   wherein the outlet of the passage is disposed within the adhesion space between the base of the lower part and the upper contact surface of the lower part.

2. The apparatus of claim 1, wherein the adhesion space is recessed downward from a top surface of the lower part.

3. The apparatus of claim 2, wherein the adhesion space has a width that is gradually narrowed downward from the top surface.

4. The apparatus of claim 3, wherein, in the adhesion space, the lower part defines an inner wall at a first side of the adhesion space closest to the support surface, the inner wall comprising an upper inner wall having a chamfered or filleted surface and a lower inner wall that is parallel to the support surface.

5. The apparatus of claim 1, further comprising a dispenser configured to inject the liquid adhesive into the passage.

6. The apparatus of claim 5, further comprising an adhesive tank configured to store the liquid adhesive and configured to supply the liquid adhesive to the dispenser.

7. The apparatus of claim 1, wherein the passage is a first passage, the lower part having a second passage extending from the outer periphery to the adhesion space, the first passage and the second passage together being configured to permit the liquid adhesive to flow from the outer periphery to the adhesion space.

8. The apparatus of claim 1, wherein the side part further comprises an inclined surface having a specific inclination toward an inside of the side part from a lower end of the support surface, the inclined surface extending from the lower end of the support surface to a top surface of the lower part.

9. A method for applying a liquid adhesive, the method comprising:
accommodating the liquid adhesive in an adhesion space of an apparatus by flowing the liquid adhesive through a passage extending from an inlet at an outer periphery of the apparatus to an outlet exposed to the adhesion space, the apparatus having a side part having a support surface, and a lower part having a base, an upper contact surface extending away from a bottom end of the support surface, and an adhesion space that is a recess defined in the lower part, the adhesion space located above the base and extending below the upper contact surface, the outlet of the passage being disposed within the adhesion space between the base of the lower part and the upper contact surface of the lower part;
positioning the secondary battery upright and inserting a sealing part disposed at one side of the secondary battery in a downward direction into the adhesion space, thereby at least partially coating the sealing part with the liquid adhesive;
withdrawing the secondary battery in an upward direction from the adhesion space; and
irradiating ultraviolet rays to the sealing part at least partially coated by the liquid adhesive.

10. The method of claim 9, further comprising injecting the liquid adhesive into the passage at the outer periphery using a dispenser.

11. The method of claim 10, further comprising the dispenser receiving the liquid adhesive from an adhesive tank that stores the liquid adhesive before the injecting of the liquid adhesive into the passage.

12. The method of claim 9, wherein, during the coating of the sealing part with the liquid adhesive, one surface of the secondary battery is supported by the support surface of the apparatus, and the sealing part disposed at the one side of the secondary battery is inserted into the adhesion space.

13. The method of claim 9, wherein the liquid adhesive is a urethane acrylate-based adhesive.

\* \* \* \* \*